United States Patent [19]

Gaudiau

[11] Patent Number: 4,630,807
[45] Date of Patent: Dec. 23, 1986

[54] ELASTIC SUPPORTED MECHANISM
[75] Inventor: Gaston Gaudiau, Le Creusot, France
[73] Assignee: Societe Mte, Puteaux, France
[21] Appl. No.: 702,028
[22] Filed: Feb. 15, 1985
[30] Foreign Application Priority Data Feb. 24, 1984 [FR] France ............................ 84 02810

[51] Int. Cl.⁴ .............................................. F16F 3/07
[52] U.S. Cl. .................... 267/140.1; 267/8 R; 267/35
[58] Field of Search .............. 267/3, 8 R, 35, 63 R, 267/140.1, 141.2, 141.3, 141.4, 141.5, 141.6

[56] References Cited

U.S. PATENT DOCUMENTS

| 36,498 | 9/1862 | Alsop | 267/35 |
| 2,573,108 | 10/1951 | Piron | 267/3 |
| 3,118,659 | 1/1964 | Paulsen | 267/63 R X |

FOREIGN PATENT DOCUMENTS

| 1152494 | 9/1957 | France | 267/35 |
| 1255804 | 1/1961 | France | 267/35 |
| 2354229 | 1/1978 | France | |
| 2363469 | 3/1978 | France | |
| 259603 | 6/1927 | United Kingdom | 267/35 |
| 918661 | 2/1963 | United Kingdom | 267/140.1 |

Primary Examiner—Duane A. Reger
Attorney, Agent, or Firm—Rines and Rines, Shapiro and Shapiro

[57] ABSTRACT

The present invention refers to an elastic supported mechanism consisting of an elastomer ring in which are arranged rigid intercalated rings adhering to the elastomer and capable in particular of being mounted in series with a helical spring, notably in a railroad bogie side suspension.

The mechanism is characterized by the fact that it comprises, in the center of the bore (14) of the elastomer ring, a central plug (2) whose outer surface (24) is separated, in the absence of pressure, from the elastomer surface of the bore of the ring and is capable of progressively coming into contact with the aforesaid elastomer surface of the bore when the ring is subjected to an increasing horizontal pressure.

16 Claims, 3 Drawing Figures

ELASTIC SUPPORTED MECHANISM

The present invention pertains to an elastic supported mechanism comprising an elastomer ring in which are arranged rigid intercalated rings adhering to the elastomer and capable, in particular, of being mounted in series with a helical spring notably in a railroad bogie side suspension.

An elastic supported mechanism of the above type has, due to its leaved structure, increased normal compressed rigidity compared with that of a contact point of the same arrangement, but unleaved, and the axial deflection is not exactly linear depending on the stress applied. On the other hand, in shearing, the deflection remains linear and the rigidity therefore remains constant.

The invention as it is characterized in the claims has the object of furnishing an elastic supported mechanism presenting axial and transversal rigidity varying according to the axial or transversal stresses applied.

The mechanism, in summary, is characterized by the fact that it comprises, in the center of the bore of the elastomer ring, a central stop, the exterior surface of which is separated, in the absence of stress, from the elastomer surface of the bore and is capable of coming progressively into contact with the aforesaid elastomer surface of the bore when the ring is subjected to an increasing horizontal stress.

According to one charactertistic, the exterior surface of the central stop is of elastomer.

According to another characteristic, the exterior surface of the central stop has an overall truncated cone shape, the bore of the ring having a generally cylindrical shape.

According to another characteristic, the central stop is formed by a cushion of elastomer adhering to the exterior of a chuck.

According to another characteristic, the elastomer outer surface of the stop and the surface of the bore of the ring form rotation waves around the axis of the ring.

According to another characteristic, each of the intercalated rings located to the level of the central stop has a bore whose diameter is greater than the diameter of the bore of the ring so that the bores of the intercalated rings will be embedded in the mass of elastomer.

The invention is now going to be described in more detail by referring to the appended drawings in which.

Figure 1:
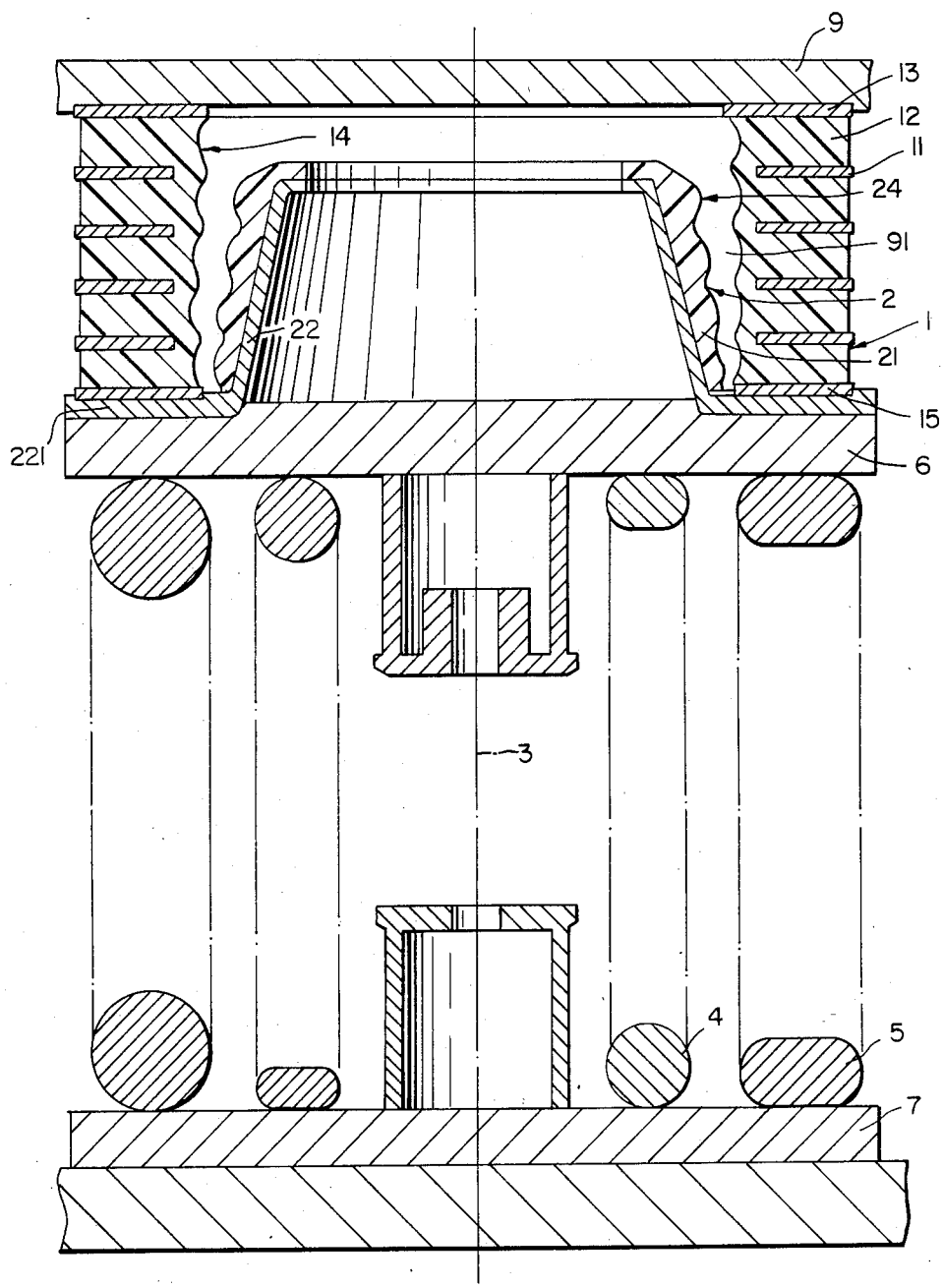
FIG. 1 represents an axial cross section of one mechanism according to the invention.

Referring to the drawings, the mechanism is comprised of an elastic ring 1 of elastomer having a leaved or sandwich structure. It is mounted in series with helical springs 4, 5. Stress is applied by means of a wheel-guard plate 9 on the ring 1. The elastomer ring 1 and the helical springs are centered on a same vertical axis 3 so that an axial compression stress is exercised. The ring 1 presses on the springs 4 and 5 by means of a capping plate 6. The helical springs press on a bottom capping plate 7.

The elastomer ring 1 has end sections that adhere to two rigid braces 13 and 15. The upper brace 13 forms one piece with the wheel guard plate 9 of a railway casing for example. The bottom brace 15 is centered in such a way as to be immobilized horizontally on the upper capping plate 6. The ring 1 includes a number of rigid metallic intercalated rings 11 which extend horizontally at various levels into the thickness of the elastomer. These intercalated rings 11 are preferably arranged at more or less equal intervals between the end braces and they are adhered to the elastomer 12. The surface 14 of the bore of the ring is of elastomer and generally cylindrical in form.

The mechanism has, in the interior of the ring 1, a central stop 2, the outer surface 24 of which is normally separated from the surface 14 of the inner periphery of the ring 1. The space between the stop and the inner periphery of the ring is filled with a fluid. The distance measured horizontally between the stop and the inner periphery of ring 1 increases from botom to top so that the maximum deflection will be on the upper part of the mechanism.

The central stop 2 is formed by an elastomer cushion 21 bonded to the exterior surface of a central metallic chuck 22. This chuck to which the cushion is bonded forms a central part of rotation (cylindrical or truncated). This part is integral with an annular flange 221 which is immobilized on the top capping plate 6. The lower brace 15 of the ring 1 is centered so as to be immobilized horizontally on the upper side of the flange 221. The cushion 21 is in the form of a sleeve that envelops the chuck 22. The outer surface 24 of the cushion 21 is shaped in such a way as to form with the cylindrical bore of the ring an annular space, the horizontal section of which increases from the bottom to the top. The intercalated rings 11 level with the central stop 2 each have a bore whose diameter is greater than the inner diameter of the ring so that the bores of the rings in will be embedded in the mass of elastomer.

The outer surface 24 of the central stop 2 and the surface 14 of the bore of ring 1 form rotation waves around the axis 3.

The height of the central stop 2 is less than the height of the ring 1. The elastomer cushion 21 encloses the upper part of the stop so as to constitute an elastic axial plug.

Figure 2:
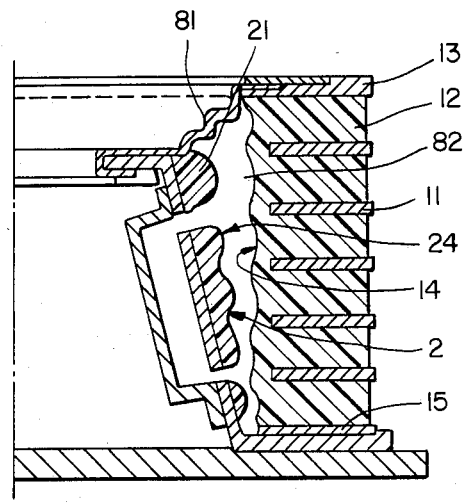
FIG. 2 is a variation of FIG. 1.

In the embodiment of FIG. 2, an annular membrane 81 closes the space between the stop 1 and the ring 2 so as to form a chamber 82. This chamber 82 contains a fluid.

The functioning of the mechanism is now going to be explained.

Figure 3:
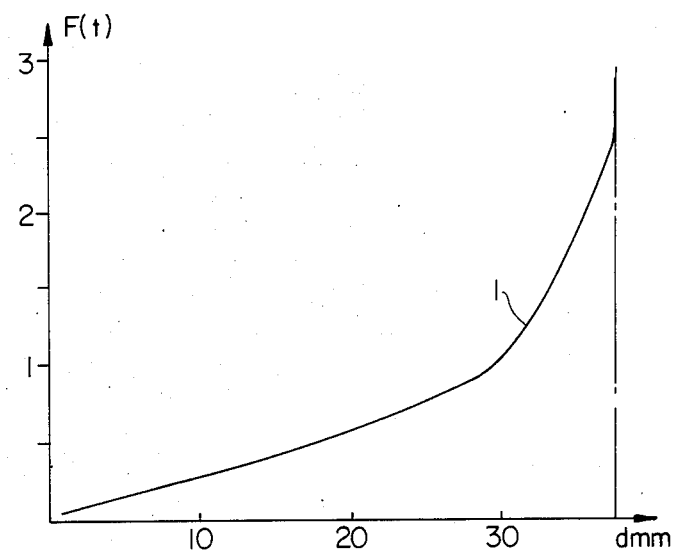
FIG. 3 is a diagram showing horizontal deflection according to horizontal stress applied to the mechanism.

Under the effect of a horizontal pressure, the ring 1 is distorted and the elastomer surface of the bore 14 comes progressively into contact with the elastomer surface 24 of the stop. The greater the horizontal pressure, the more the surface contact between 14 and 24 increases, the deflection being maximum on the top part. FIG. 3 gives the variation of the horizontal deflection with respect to the total horizontal stress for the entire mechanism constituted by the helical springs, the ring and the stop (curve 1).

It is certainly understood that, without leaving the framework of the invention, one may imagine variations and modifications of detail and also envisage the use of equivalent methods. For example, ring 1 and the central stop 2 may be molded together or separately. The elastomer of the ring could be bonded directly on the top cap of the spring or on the flange 221. The span of the plug could be of polyamide or any other plastic matter.

I claim:

1. An elastic supported mechanism comprising a hollow elastic ring of generally cylindrical cross section, a plurality of intercalated rigid rings within said elastic ring respectively disposed about the axis of said elastic ring, said intercalated rings being spaced from one another along the axis of said elastic ring in substantially parallel relationship with one another, a stop fixedly disposed within a central bore of said elastic ring and having an outer peripheral surface normally spaced from the inner periphery of said elastic ring, said outer peripheral surface of said stop and the inner periphery of said elastic ring being configured such that when said elastic ring is subjected to an increasing pressure perpendicular to said axis thereof, said outer peripheral surface of said stop and the inner periphery of said elastic ring come progressively into contact with each other, thereby progressively increasing the rigidity of said mechanism in the direction of said load.

2. Mechanism according to claim 1, characterized by the fact that the outer peripheral surface of the stop is of elastomer.

3. Mechanism according to claim 1, characterized by the fact that the outer surface of the stop has a general truncated cone shape, the inner periphery of the elastic ring having a generally cylindrical form.

4. Mechanism according to claim 1, characterized by the fact that the outer peripheral surface of the stop is shaped so that, together with the inner periphery of the elastic ring, it forms an annular space, the horizontal section of which increases from one end to another along the axis of the elastic ring.

5. Mechanism according to claim 1, characterized by the fact the the stop is formed by a cushion of elastomer adhering to the outside of a chuck.

6. Mechanism according to claim 1, characterized by the fact the the stop has an annular flange on which a bottom end brace of the elastic ring is centered.

7. Mechanism according to claim 1, characterized by the fact that the outer peripheral surface of the stop and the inner periphery of the elastic ring form rotation waves around the axis of the elastic ring.

8. Mechanism according to claim 1, characterized by the fact that each of said intercalated rings which is disposed axially along the stop has an inner diameter greater than that of the inner periphery of the elastic ring so that an inner periphery of each such intercalated ring will be buried within the elastic ring.

9. Mechanism according to claim 1, characterized by the fact that it has an annular membrane closing the space between the outer peripheral surface of the stop and the inner periphery of the elastic ring so as to form a chamber, said chamber containing a fluid.

10. Mechanism according to claim 1, characterized by the fact that the elastic ring is mounted in series with at least one helical spring.

11. An elastic supported mechanism comprising a substantially cylindrical elastic ring having a central bore, a pair of rigid brace members bonded to opposite axial end surfaces of said elastic ring, a plurality of rigid flat ring members disposed within said elastic ring respectively about a central axis thereof, said ring members being parallel to one another and spaced apart from one another along said axis, and stop means fixedly disposed within said central bore of said elastic ring and having an outer peripheral surface normally spaced from the inner periphery of said elastic ring in the absence of a load on said elastic ring in a direction perpendicular to said axis thereof, said outer peripheral surface of said stop means and the inner periphery of said elastic ring being configured such that when said elastic ring is subjected to a load in said perpendicular direction, said outer peripheral surface of said stop means and the inner periphery of said elastic ring come progressively into contact to increase the rigidity of said mechanism in said direction.

12. Mechanism according to claim 11, characterized in that said ring members have inner diameters greater than the inner diameter of said elastic ring such that inner peripheral surface of said ring members are embedded within said elastic ring.

13. Mechanism according to claim 11, characterized in that said outer outer peripheral surface of said stop means is in the form of a truncated cone and the inner periphery of said elastic ring is in the form of a substantially cylindrical wall.

14. Mechanism according to claim 13, characterized in that said stop means has a flange projecting outwardly from a base end of said truncated cone shaped portion, one of said brace members of said elastic ring being supported on said flange in a fixed position.

15. Mechanism according to claim 11, characterized in that an annular membrane closes a space between said outer peripheral surface of said stop means and the inner periphery of said elastic ring so as to form a chamber, said chamber containing a fluid.

16. A support mechanism comprising, in combination, first and second capping plate means separated from one another along a first axis, spring means disposed intermediate said first and second capping plates and compressible therebetween along said first axis in response to a load along said axis, and elastic support means deformable along a second axis perpendicular to said first axis and mounted in a fixed position on said second capping plate means, said elastic support means including a substantially cylindrical elastic ring having a central bore and extending axially in the direction of said first axis, a pair of rigid brace means bonded to opposite axial end surfaces of said elastic ring, a plurality of flat rigid ring members disposed within said elastic ring respectively about the axis thereof, said ring members being spaced apart along the axis of said elastic ring and parallel to one another, and stop means fixedly disposed within said central bore of said elastic ring and having an outer peripheral surface normally spaced from the inner periphery of said elastic ring, said outer peripheral surface of said stop means and the inner periphery of said elastic ring being configured such that when a load in the direction of said second axis is applied to a one of said brace members opposite said second capping plate means, the inner periphery of said elastic ring comes progressively into contact with said outer peripheral surface of said stop means.

* * * * *